(12) United States Patent
Jean et al.

(10) Patent No.: US 7,567,011 B1
(45) Date of Patent: Jul. 28, 2009

(54) MEMS LINEAR THERMOELECTRIC MOTOR APPARATUS

(75) Inventors: Daniel L. Jean, Odenton, MD (US); Ezra Chen, Potomac, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 429 days.

(21) Appl. No.: 11/701,208

(22) Filed: Feb. 1, 2007

(51) Int. Cl.
*H02N 10/00* (2006.01)
(52) U.S. Cl. ...................... 310/306; 310/300
(58) Field of Classification Search ............... 310/306, 310/307, 309, 328
See application file for complete search history.

(56) References Cited

U.S. PATENT DOCUMENTS

| 5,929,542 | A  | 7/1999  | Ohnstein et al. |
|-----------|----|---------|-----------------|
| 6,380,661 | B1 | 4/2002  | Henderson et al.|
| 6,465,929 | B1 | 10/2002 | Levitan et al.  |
| 6,675,578 | B1 | 1/2004  | Sinclair        |
| 7,043,910 | B2 | 5/2006  | Hickey          |

*Primary Examiner*—Mark Budd
(74) *Attorney, Agent, or Firm*—Fredric J. Zimmerman

(57) ABSTRACT

A thermoelectric actuator moves in a first direction and an opposite direction upon the application and removal of a current. An actuator means is driven by the thermoelectric actuator and includes a set of drive teeth. The drive teeth engage with a first set of teeth on a slider member to move it to a desired position. A spring biases the slider back to an initial position. A keeper arrangement, having teeth that engage a second set of teeth on the slider, maintains the slider in its advanced position and prevents it from going back to its initial position.

13 Claims, 11 Drawing Sheets

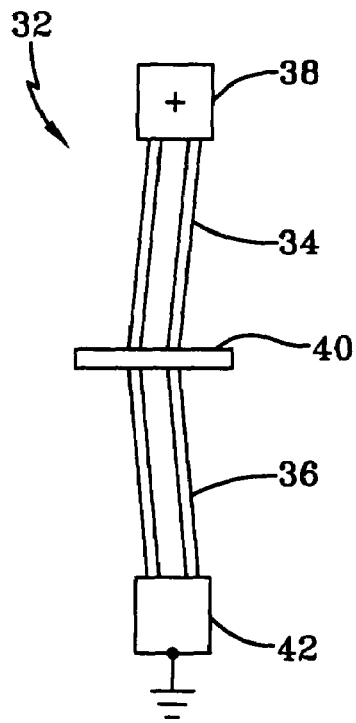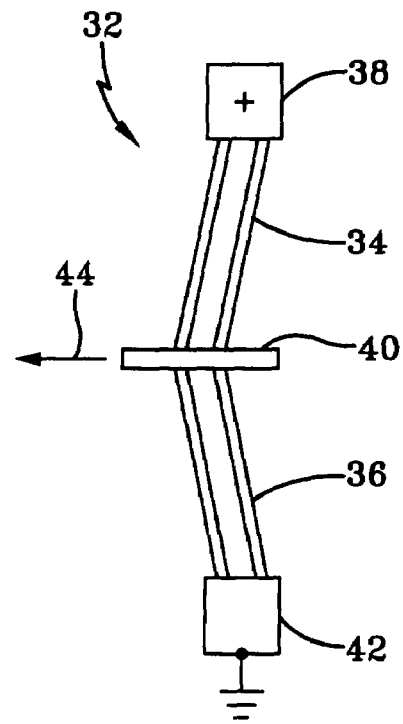
FIG-3A          FIG-3B
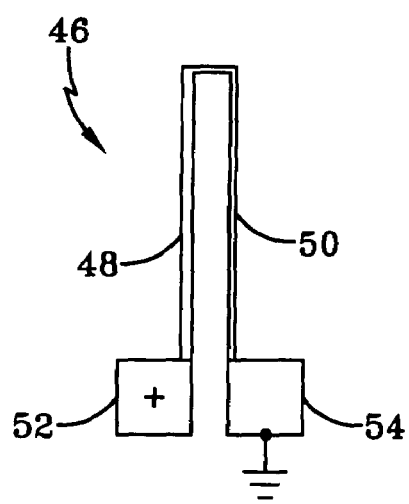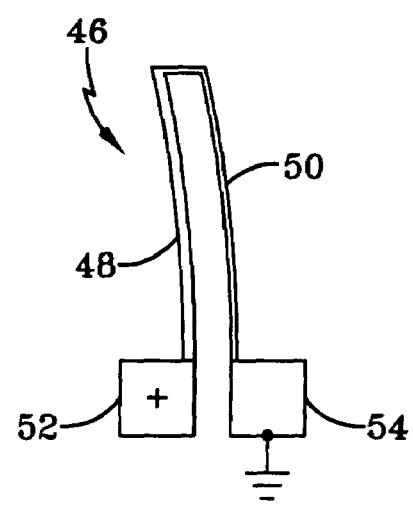
FIG-4A          FIG-4B

US 7,567,011 B1

MEMS LINEAR THERMOELECTRIC MOTOR APPARATUS

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

The invention relates in general to MEMS (microelectromechanical systems) devices and more particularly to a MEMS device that uses a V-beam or U-beam actuator as a driver.

A need exists for a MEMS device that will function to move an item into or out of a position. Electrostatics, which uses the mutual attraction of parts at different potentials as the driving force, is used in numerous MEMS devices. Such electrostatic actuators generally employ comb drives to create the necessary electromagnetic field to cause motion.

Electrostatics is attractive due to the relatively low power consumption. However, there are several disadvantages to using electrostatics. A significant voltage source is required for large deflections, sometimes in the hundreds of volts, which is not practical, and there is a chance of arcing. In addition, comb drives are large and bulky and the distance of travel is limited by the separation of the combs. Electrostatic actuators also provide very low force.

Another type of MEMS device used for this purpose involves an electromagnetic actuator. Such electromagnetic actuators however, require the fabrication of wire coils. Fabrication of these wire coils for the electromagnetic fields at a micro scale is extremely difficult since vertical loops have to be constructed around a slider element.

SUMMARY OF THE INVENTION

It is an object of the present invention to provide a MEMS actuator which can provide high force and which does not require a high voltage for operation.

It is another object to provide a MEMS actuator that has a longer stroke than an electrostatic device.

Another object is to provide a MEMS actuator that does not require the winding of any coils.

A MEMS linear thermoelectric motor apparatus in accordance with the present invention includes a thermoelectric actuator operable to move in a first direction when energized by a current and to move in an opposite direction when deenergized by removal of the current. An actuator means is connected to the thermoelectric actuator for movement by the thermoelectric actuator when it is energized and deenergized, and includes at least one set of drive teeth.

A slider member is provided and includes at least a first set of teeth. At least one set of drive teeth are engageable with the first set of teeth to move the slider when the thermoelectric actuator is either energized or deenergized, depending upon the direction of the teeth engagement. A spring is connected to the slider to bias it to an initial position. A keeper means having a keeper arrangement engageable with the slider maintains the slider in position against the action of the spring, after the slider has been advanced.

BRIEF DESCRIPTION OF THE DRAWINGS

In the drawings, which are not necessarily to scale, like or corresponding parts are denoted by like or corresponding reference numerals.

FIGS. 3A and 3B illustrate one type of actuator which may be used herein.

FIGS. 4A and 4B illustrate another type of actuator.

DETAILED DESCRIPTION OF EXEMPLARY EMBODIMENTS OF THE INVENTION

Figure 1A:
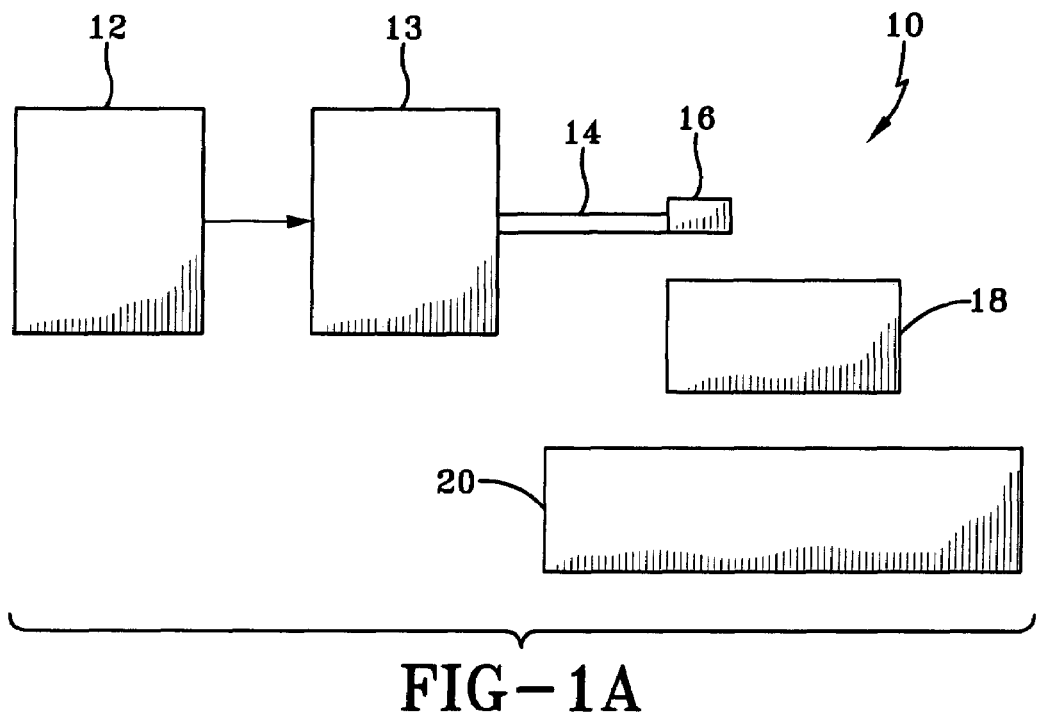
FIGS. 1A and 1B illustrate one use for a MEMS actuator.
Figure 1B:
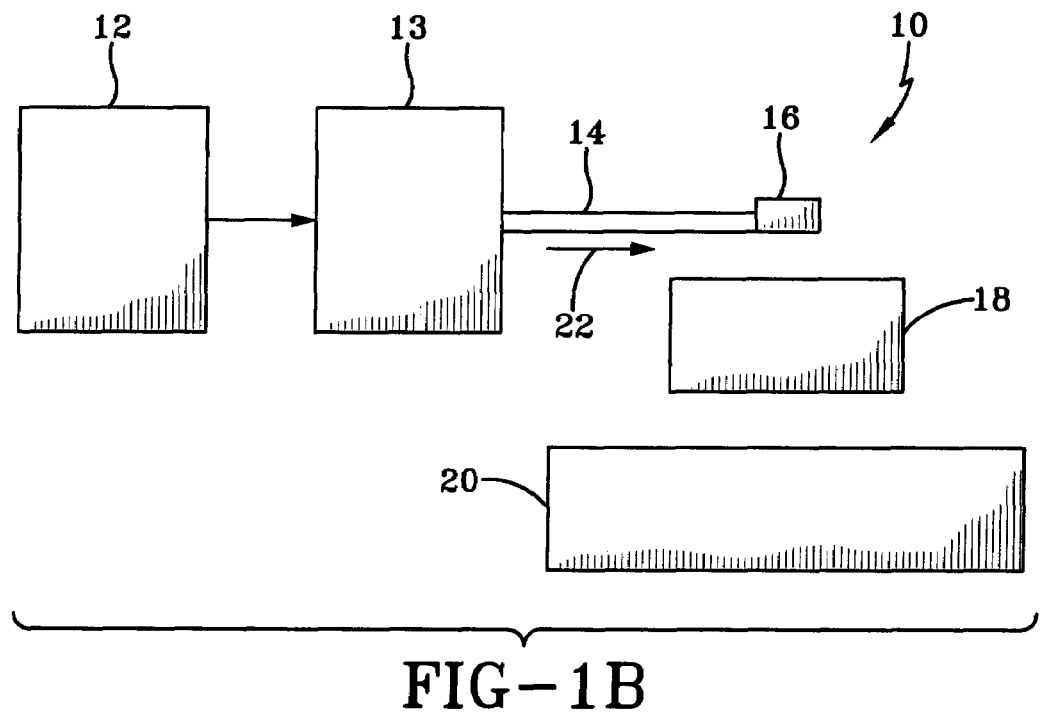

FIGS. 1A and 1B illustrate one potential use, of many, for the apparatus of the present invention. The MEMS linear thermoelectric motor apparatus 10 includes a thermoelectric actuator or driver 12 operative to move actuator means 13, which in turn moves a slider element 14 carrying an object 16 at an end thereof. In the example of FIG. 1, the object 16 is a microdetonator. The microdetonator 16 is used to set off a secondary explosive in the form of explosive lead 18, which when activated, will set off the main charge 20, forming a portion of a munition round, by way of example.

In FIG. 1A, the microdetonator 16 is in an initial position insufficient to set off the secondary explosive 18. When the thermoelectric actuator 12 is engaged, as indicated in FIG. 1B, it will cause actuator means 13 to move slider 14 in the direction of arrow 22 until the microdetonator 16 is directly above explosive lead 18, whereupon the entire detonation process may proceed. In addition to the above, the apparatus of the present invention finds use with a variety of fuzing scenarios. Further, the apparatus has application with respect to fiber optics, micro-fluidic valves, micro mirror applications and other precision positioning operations, to name a few.

Figure 2:
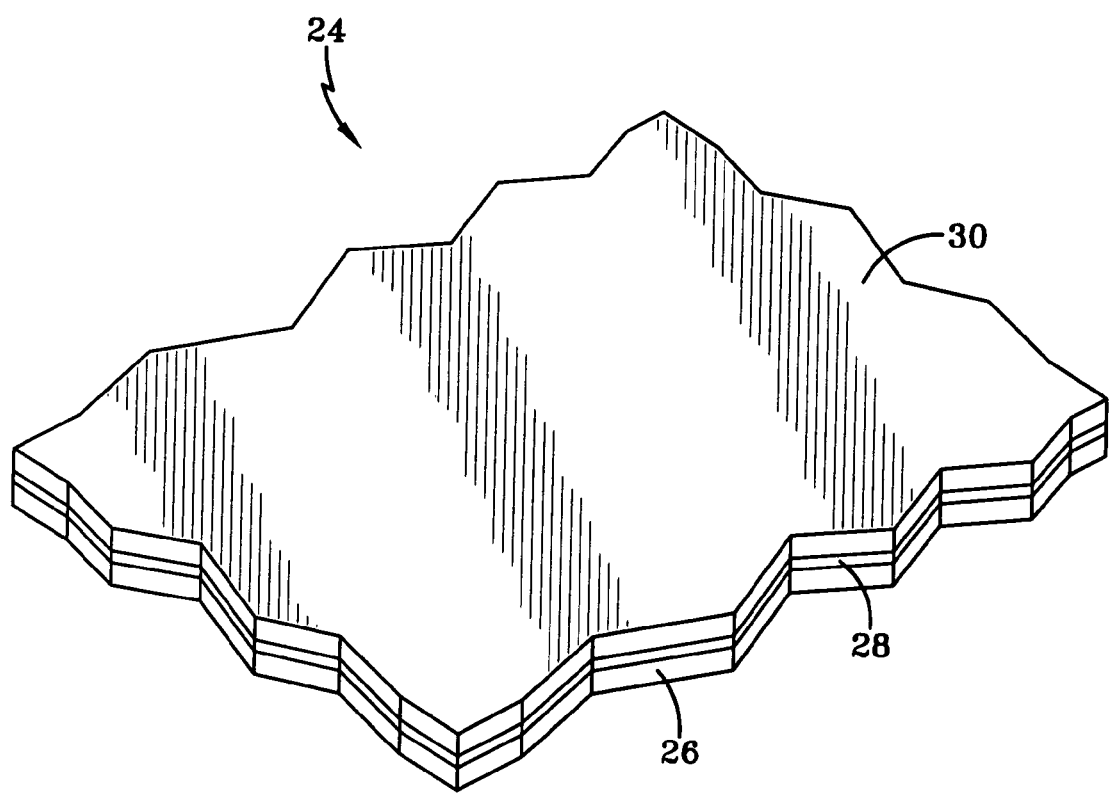
FIG. 2 illustrates an SOI (silicon on insulator) wafer prior to fabrication of the MEMS device of the present invention.

FIG. 2 illustrates a portion of a silicon on insulator (SOI) wafer 24 from which the thermoelectric motor apparatus of the present invention will be fabricated. The structure of FIG. 2 includes a silicon substrate 26 (also known as a handle layer) covered by an insulating, or intermediate layer 28, such as silicon dioxide, over which is bonded or deposited another silicon layer 30, also known as the device layer, which is the layer from which the thermoelectric motor components will be fabricated. The thermoelectric motor components are formed by a DRIE (deep reactive ion etching) process, which removes unwanted portions of device layer 30. The DRIE process is a well-developed micromachining process used extensively with silicon based MEMS devices. For this reason, silicon is an exemplary material for the thermoelectric motor apparatus of the present invention, although other materials are possible.

The invention uses a thermoelectric actuator, one type of which is illustrated in FIGS. 3A and 3B. FIG. 3A illustrates a V-shaped beam (V-Beam) thermoelectric actuator 32 which includes first and second sets of actuator beams 34 and 36, each set including one or more individual beams, two being illustrated by way of example. One end of set 34 is connected to anchor 38, while the other end is connected to an actuator arm 40. One end of set 36 is connected to a second anchor 42, with the other end being connected to actuator arm 40. The beams of sets 34 and 36 are of a conductive elastic material with a high melting point, such as silicon. When a current is applied to anchor 38, the beams expand, causing the actuator arm 40 to move in the direction of arrow 44, as illustrated in FIG. 3B. When the current is turned off, the actuator arm 40 reverts to its original position as in FIG. 3A.

Another type of thermoelectric actuator is illustrated in FIGS. 4A and 4B. FIG. 4A illustrates a U-shaped beam (U-beam) thermoelectric actuator 46, which includes a thick beam 48 joined to a thin beam 50, with the beams being connected to respective anchors 52 and 54. Application of current to anchor 52 causes the beams to bend, as in FIG. 4B. Any actuator arm connected to one of the beams will move accordingly, and when the current is removed, the beams will assume the position as in FIG. 4A.

Figure 5A:
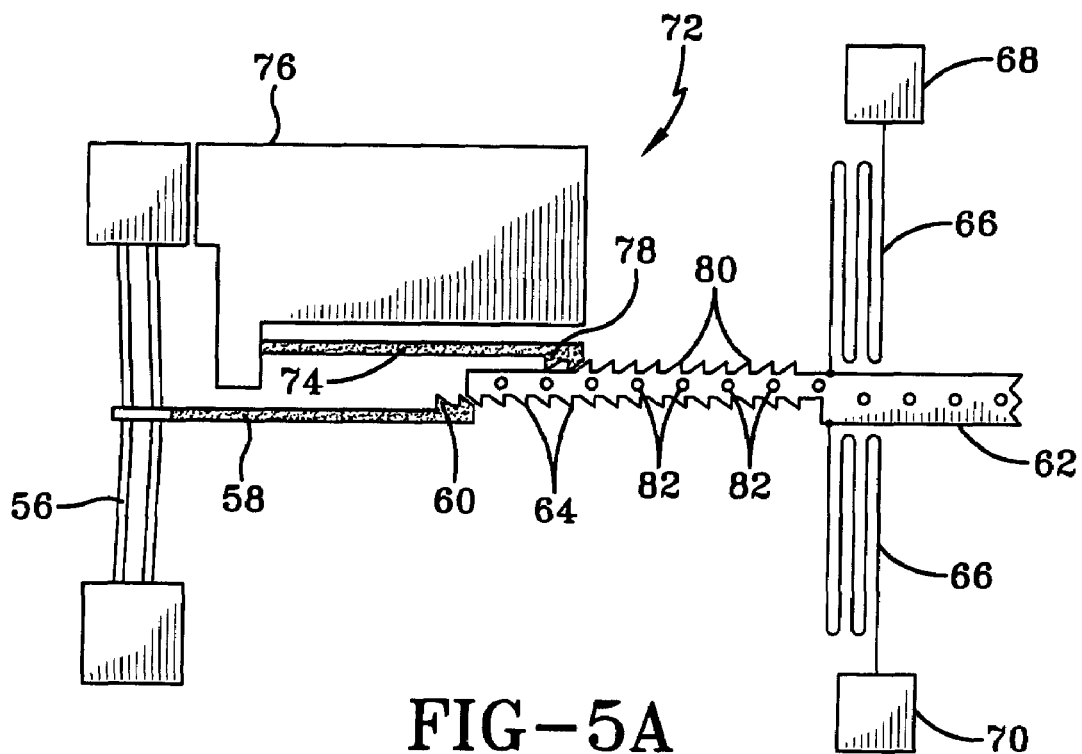
FIGS. 5A to 5D illustrate the operation of one embodiment of the present invention with a V-beam actuator.

FIG. 5A illustrates a MEMS linear thermoelectric motor apparatus utilizing a V-beam actuator 56. An actuator means (sometimes referred to as "an actuator device") is connected for movement with the V-beam actuator 56 and includes a set of drive teeth. In the embodiment of FIG. 5A, the actuator means has an actuator arm 58 connected to the V-beam actuator 56. Arm 58 includes at the end thereof a set (one or more) of drive teeth 60. The apparatus also includes a slider 62 having at least one set of teeth 64 on the lower portion thereof. Slider 62 is connected to one or more sets of springs, such as spring 66, biased so as to draw slider 62 back to its original position. Spring 66 is attached to anchors 68 and 70.

Keeper means 72 are provided to prevent the return of the slider 62 back to its original position, unless such return is called for. The keeper means 72 includes a keeper arrangement, which engages the slider 62. Such keeper arrangement may include, for example, a frictional clamp for preventing slider movement. In the embodiment of the invention described in FIGS. 5A to 5D, however, such keeper arrangement includes an arm 74 attached to anchor 76. A set of keeper teeth 78 is positioned at the end of arm 74 that is operable to engage a second set of teeth 80 on the upper portion of slider 62 and act as a keeper.

In order to operate as a MEMS thermoelectric motor, the beams of V-beam actuator 56, as well as actuator arm 58, slider 62, springs 66 and arm 74 must be free to move and therefore must be free of any underlying silicon dioxide insulating layer 28 (FIG. 2). One way to accomplish the removal of the underlying insulating layer is by applying an etchant such as hydrofluoric acid, which will dissolve the silicon dioxide.

The etchant will, in a relatively short period of time, dissolve the insulation beneath the arms 58 and 74 as well as springs 66, since they are of small width, thus freeing them for movement. In order to shorten the time for dissolving the silicon dioxide under the slider 62, it is provided with a series of apertures 82 which extend from the top surface down to the insulating layer 28, thereby allowing the etchant direct access to the undersurface of the slider 64. Although some of the etchant dissolves the insulation under the anchors, the process of freeing the other components is completed before the anchors are completely freed so that they remain immovable.

Figure 5B:
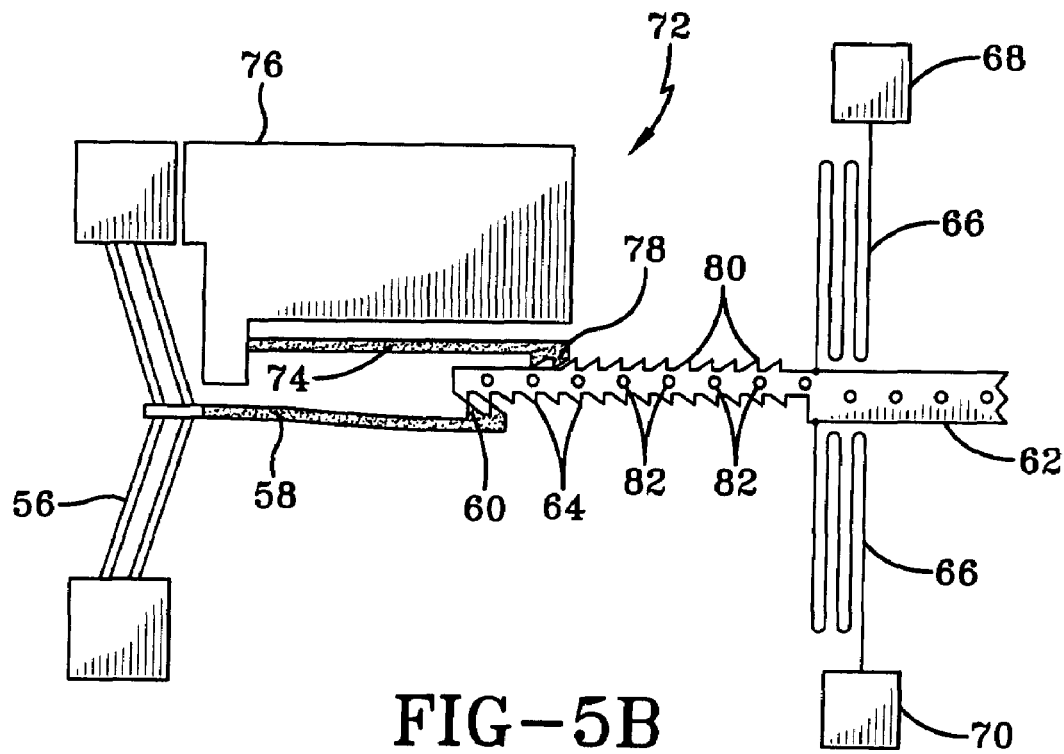
Figure 5C:
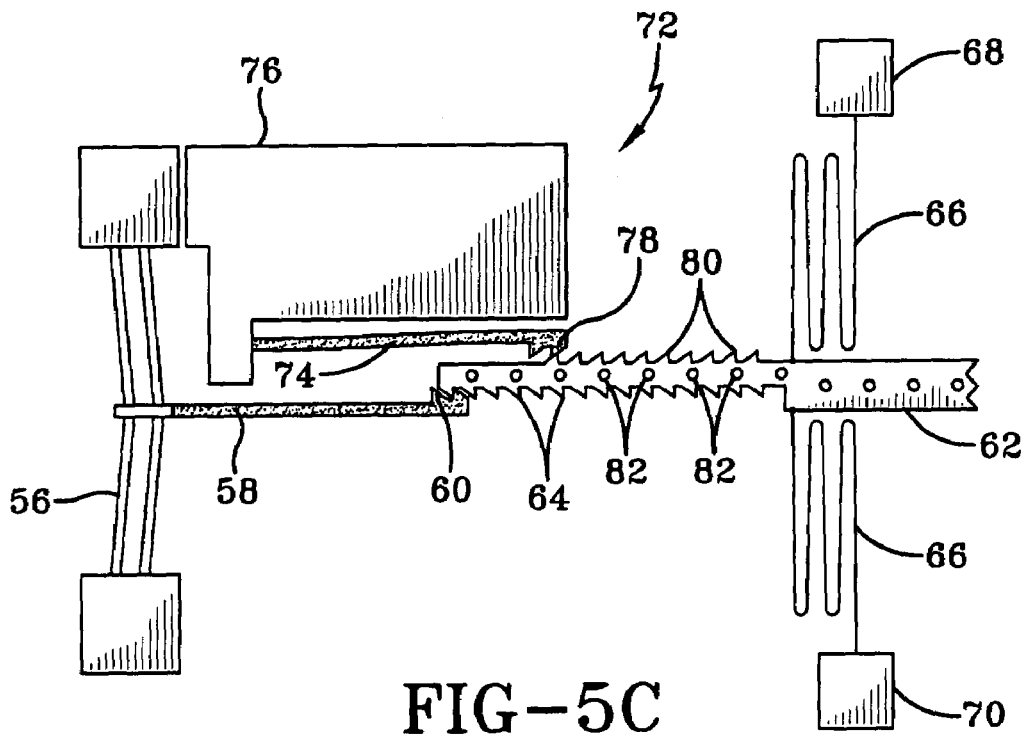
Figure 5D:
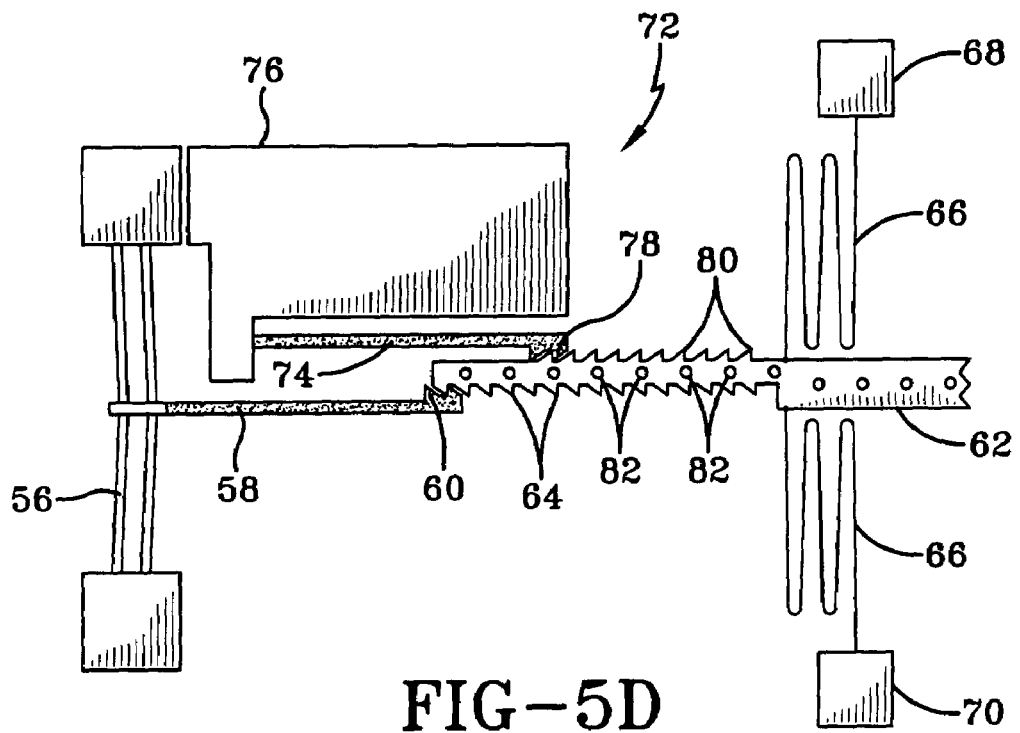

When V-beam actuator 56 is energized, the actuator arm 58 will move to the right, as illustrated in FIG. 5B and teeth 60 on actuator arm 58 will slide past teeth 64 on slider 62. In FIG. 5C, energization has ceased and V-beam actuator 56 starts to assume its initial position as in FIG. 5A. When this happens, due to their directionality, teeth 60 on actuator arm 58 engage teeth 64 on slider 62 and pull slider 62 to the left until it assumes the position in FIG. 5D. Keeper teeth 78 on arm 74 lock with teeth 80 on top of slider 62 to ensure that slider 62 cannot revert to it original position under action of spring 66. The process is repeated until slider 62 has moved a predetermined distance such that the object to which it is connected (not illustrated) has attained a desired location. If for some reason it desired to release the slider 62 so that it does revert to its original position, another V-beam actuator (not illustrated) may be employed to move the locking arm 74 out of the way to disengage keeper teeth 78.

Figure 6A:
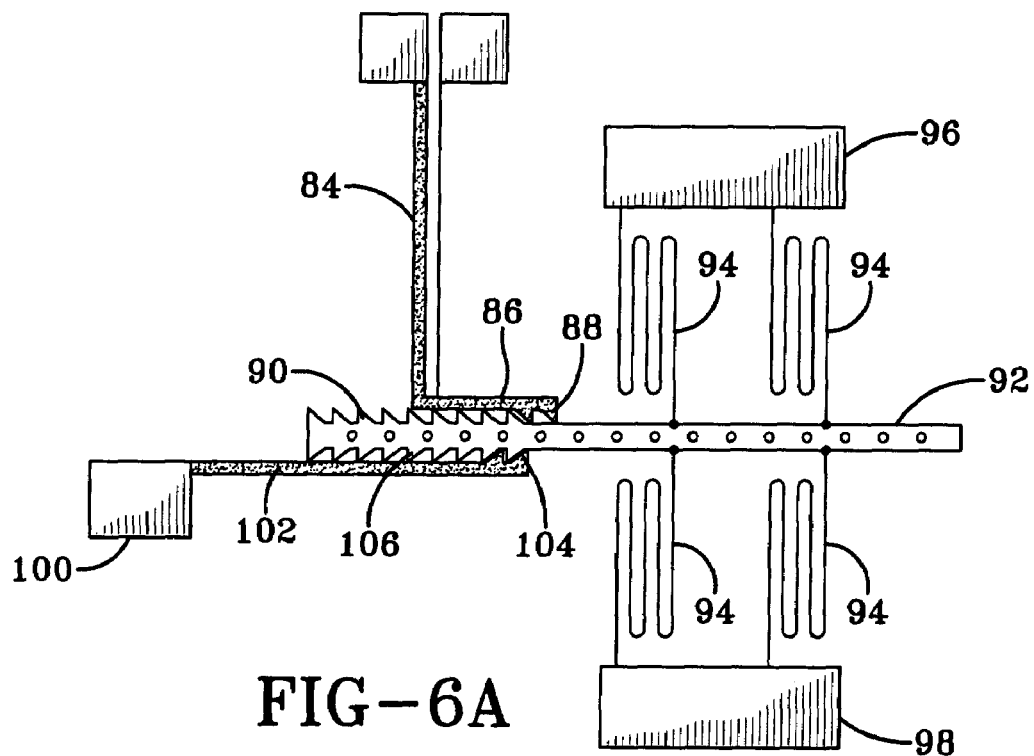
FIGS. 6A to 6C illustrate the operation with a U-beam actuator.
Figure 6B:
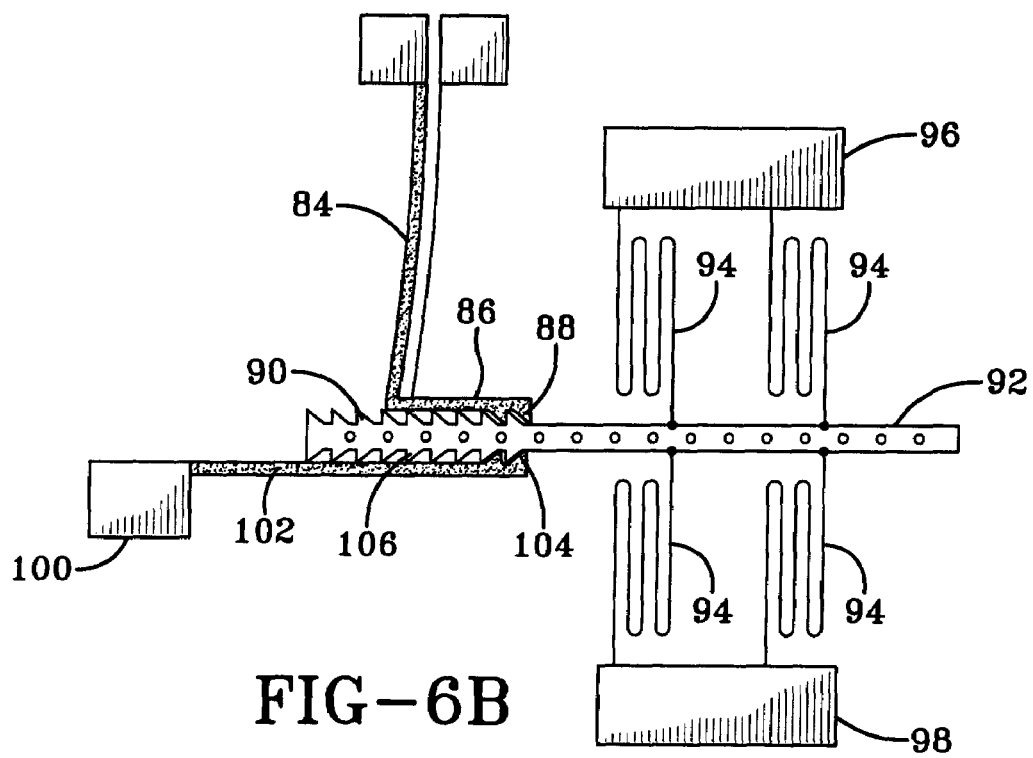
Figure 6C:
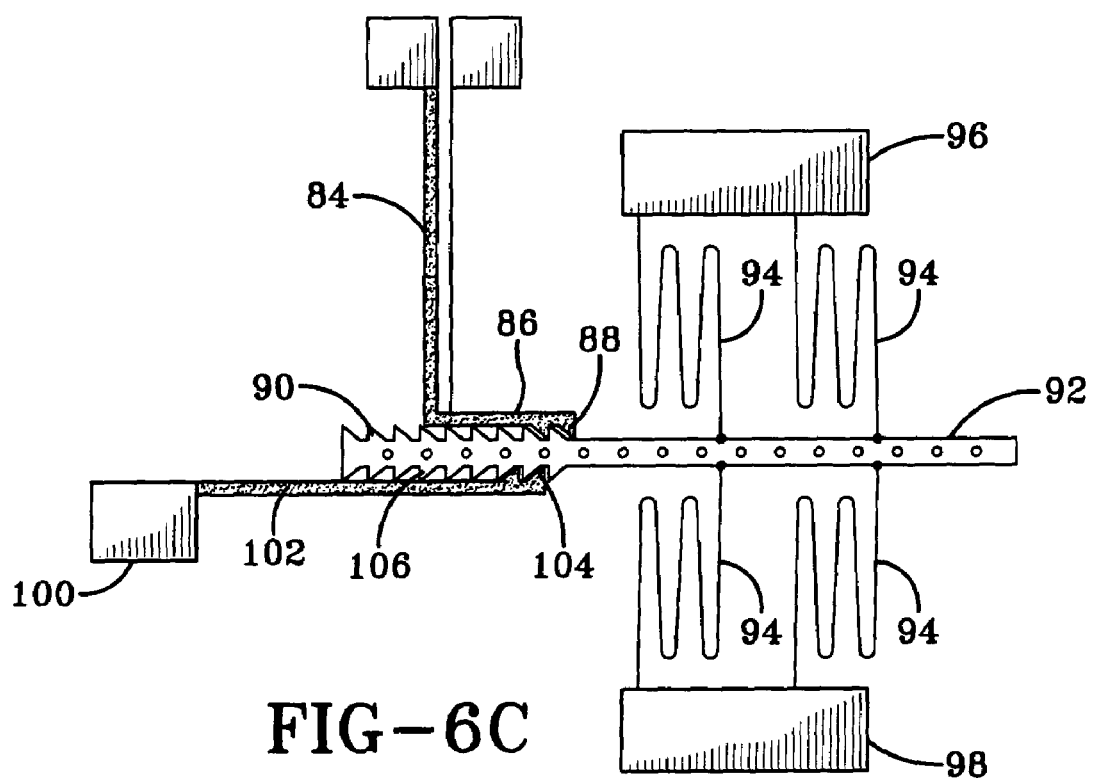

The embodiment in FIGS. 6A to 6C utilizes a U-beam actuator 84. Positioned at the end of the U-beam actuator 84 is an actuator arm 86 having a set of drive teeth 88 at its end. These teeth 88 engage with teeth 90 on the upper portion of apertured slider 92. Springs 94, connected to respective anchors 96 and 98 bias slider 92 to an initial position. Extending from anchor 100 is an arm 102 having keeper teeth 104 at its end which engage with teeth 106 on the lower portion of slider 92 to act as a keeper against action of springs 94. When the U-beam actuator 84 is energized it will bend, as illustrated in FIG. 6B, moving teeth 88 into engagement with teeth 90 on slider 92. When the U-beam actuator 84 is deenergized, it will assume the position as illustrated in FIG. 6C and in so doing, the engaged teeth 88 and 90 will cause slider 92 to move to the right. The process is repeated until the desired position of slider 92 is attained.

Figure 7A:
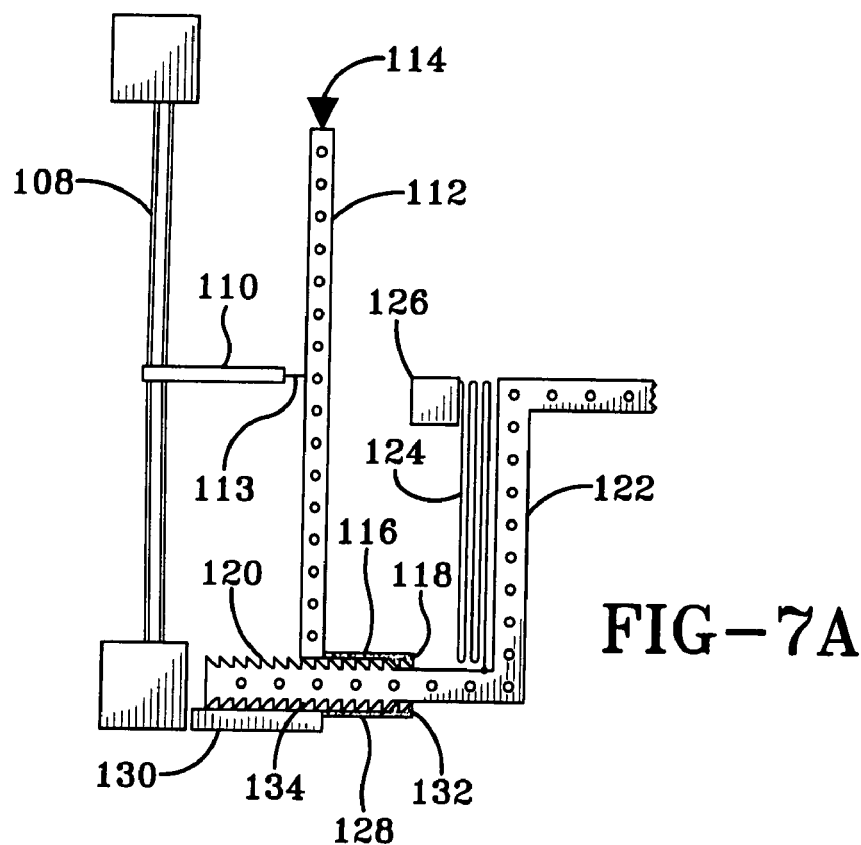
FIGS. 7A to 7D illustrate another embodiment of the invention.

To increase the throw per cycle, but reduce the time to fully extend the slider, the thermoelectric actuator can be coupled to an actuator means which includes a lever, as illustrated in FIGS. 7A to 7D. In FIG. 7A, V-beam actuator 108 has an actuator arm 110 coupled to the middle of an apertured lever 112 by a flexural member 113. The lever 112 is pivotable about fulcrum 114 at its top. An arm 116 extending from the lower portion of lever 112 includes a set of drive teeth 118 which are engageable with teeth 120 on the top portion of apertured slider 122. A spring 124, connected to anchor 126, biases the slider 122 to its initial position.

Figure 7B:
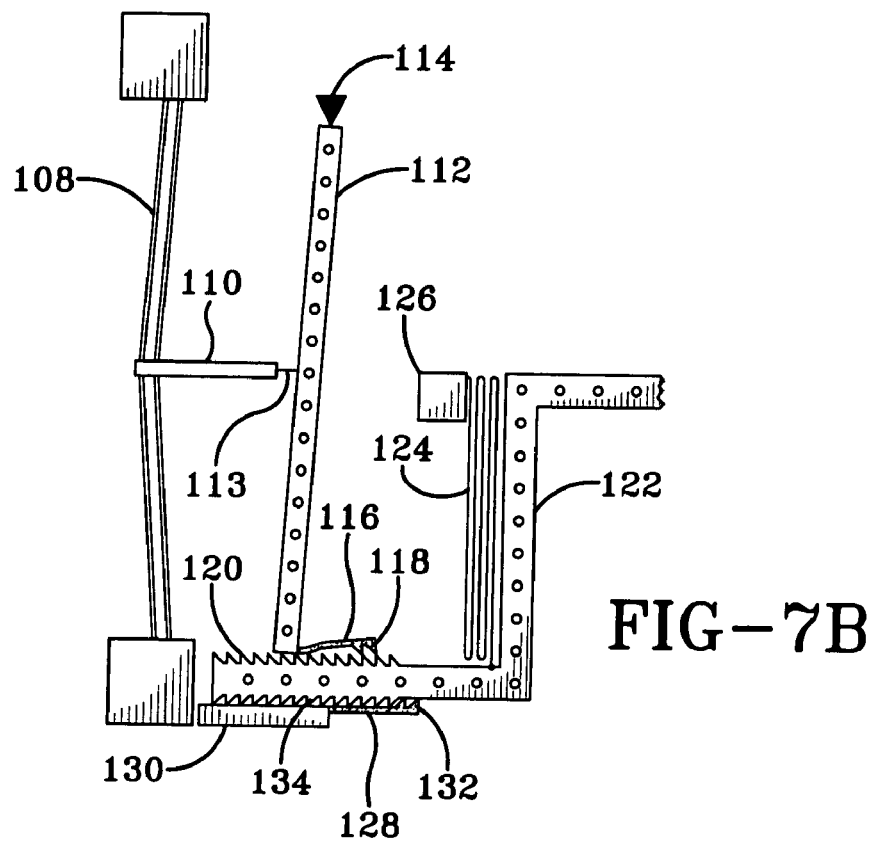
Figure 7C:
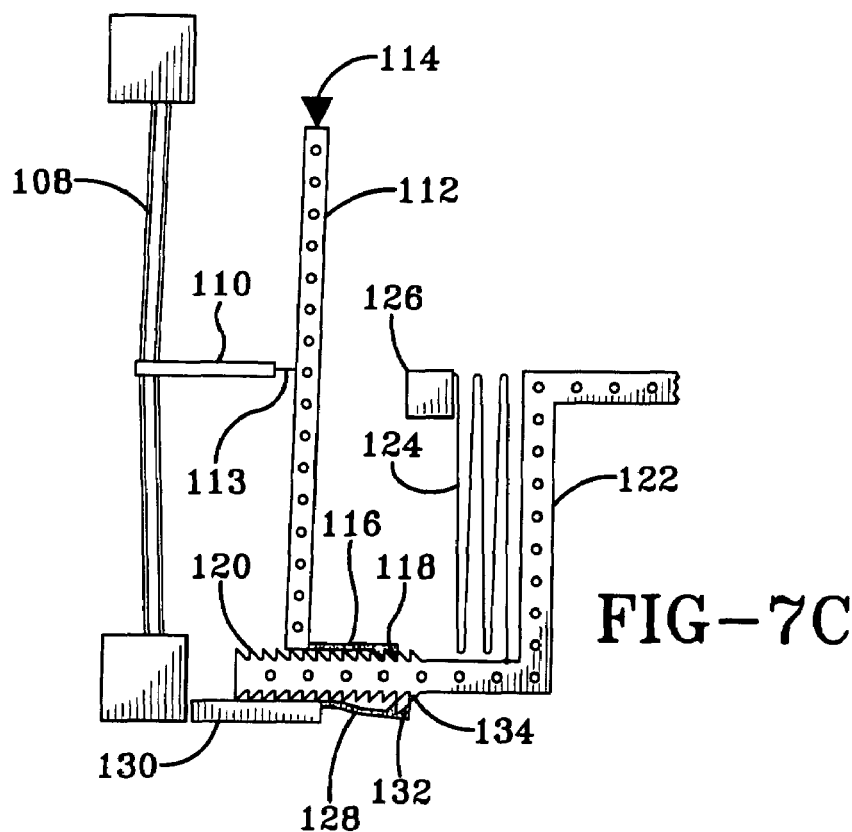
Figure 7D:
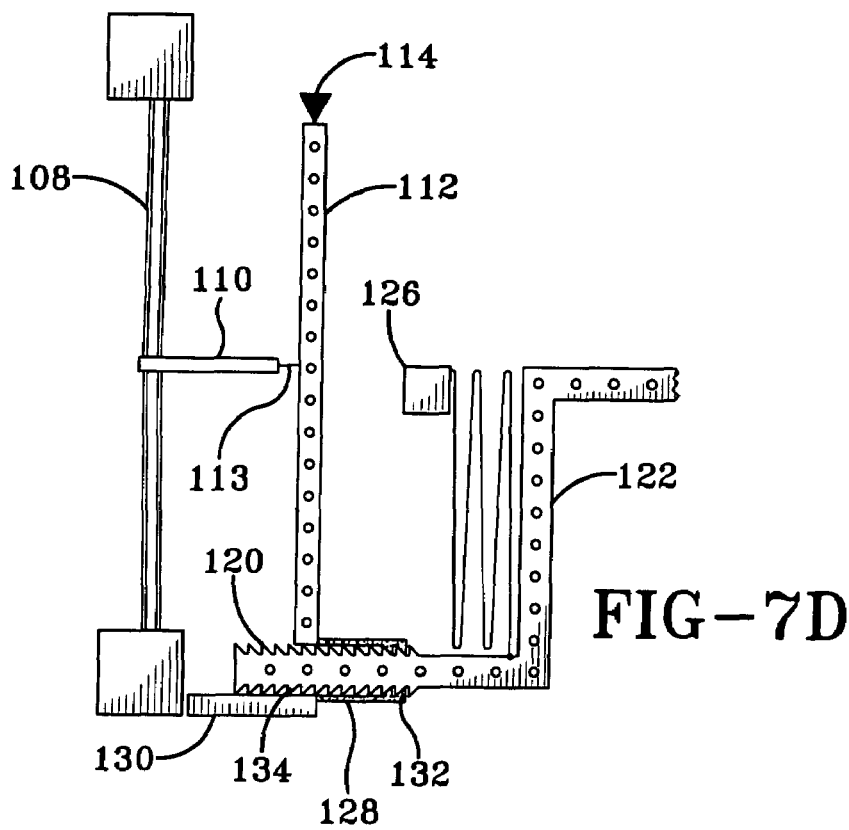

A keeper arm 128, connected to anchor 130, includes a set of keeper teeth 132 at its end for engagement with teeth 134 on the lower portion of slider 122. When teeth 132 engage teeth 134, the slider 122 is prevented from assuming its initial position under action of spring 124. When current is applied to V-beam actuator 108, it will draw lever 112 to the left, as illustrated in FIG. 7B. When this occurs, teeth 118 on arm 116 of the lever 112 will slide over teeth 120 on the slider 122. When the current is removed, and as illustrated in FIG. 7C, the lever 112 starts to assume its initial vertical position. In so doing, teeth 118 engaging teeth 120 will push slider 122 to the right. The full stroke is achieved in FIG. 7D when the lever 112 is in its vertical position whereupon the process is repeated. Keeper teeth 132 on keeper arm 128 engaging teeth 134 on the bottom of slider 122 prevent the slider 122 from assuming its initial position due to spring action.

Figure 8A:
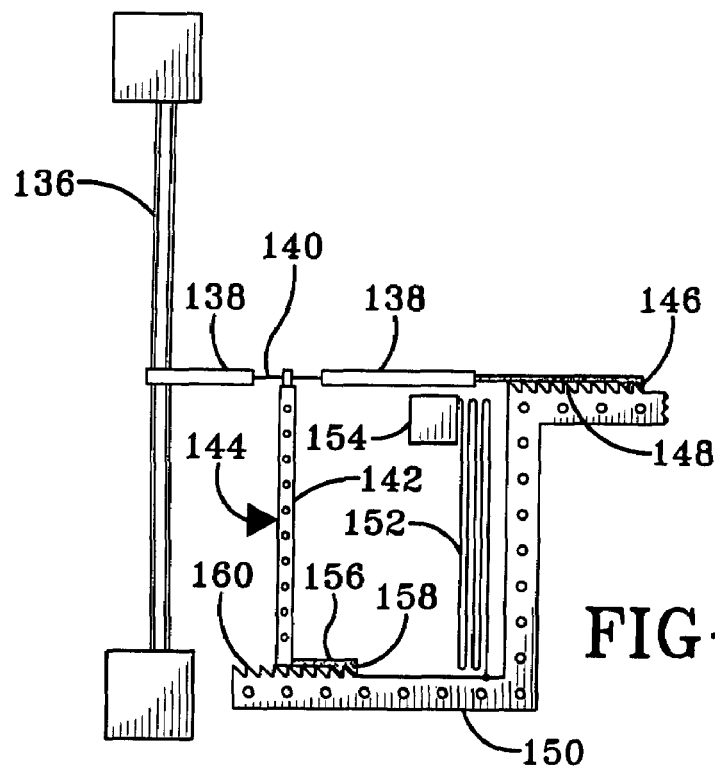
FIGS. 8A to 8D illustrate yet another embodiment.

FIGS. 8A to 8D illustrate an embodiment which also includes a lever but wherein the driving force is applied to the top of the lever rather than the middle as in FIGS. 7A to 7D. This embodiment is unique in that the slider will move both when the V-beam actuator is energized as well as deenergized. As seen in FIG. 8A, the arrangement includes a V-beam actuator 136 having an actuator arm 138 which is interrupted by a flexural member 140, to which is connected the top of an apertured lever 142. In response to movement of actuator arm 138, lever 142 will pivot around a fulcrum 144. Actuator arm 138 includes a set of teeth 146 which are engageable with teeth 148 on a top portion of apertured slider 150. The slider is biased by a spring 152 connected to anchor 154.

Figure 8B:
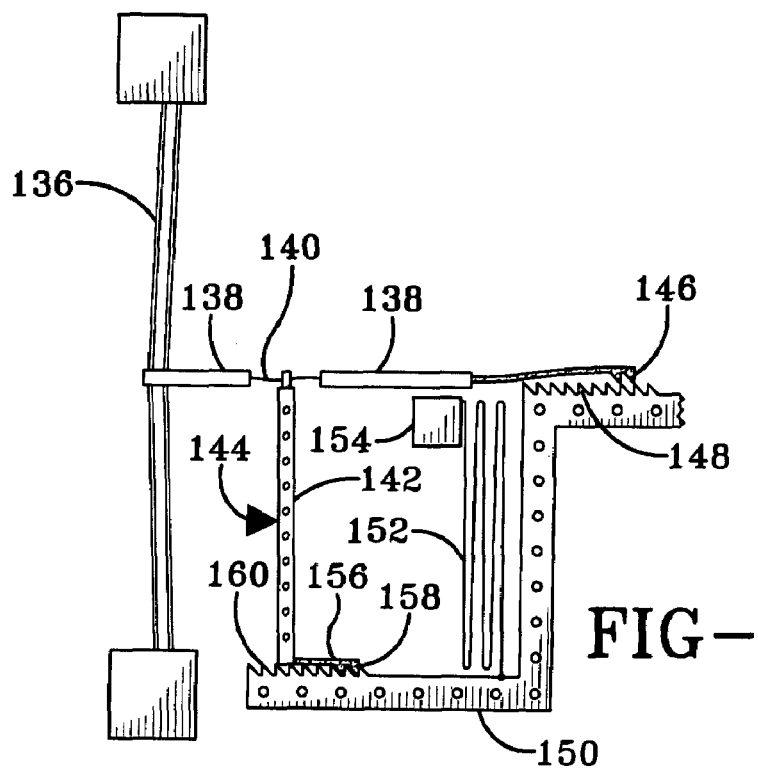
Figure 8C:
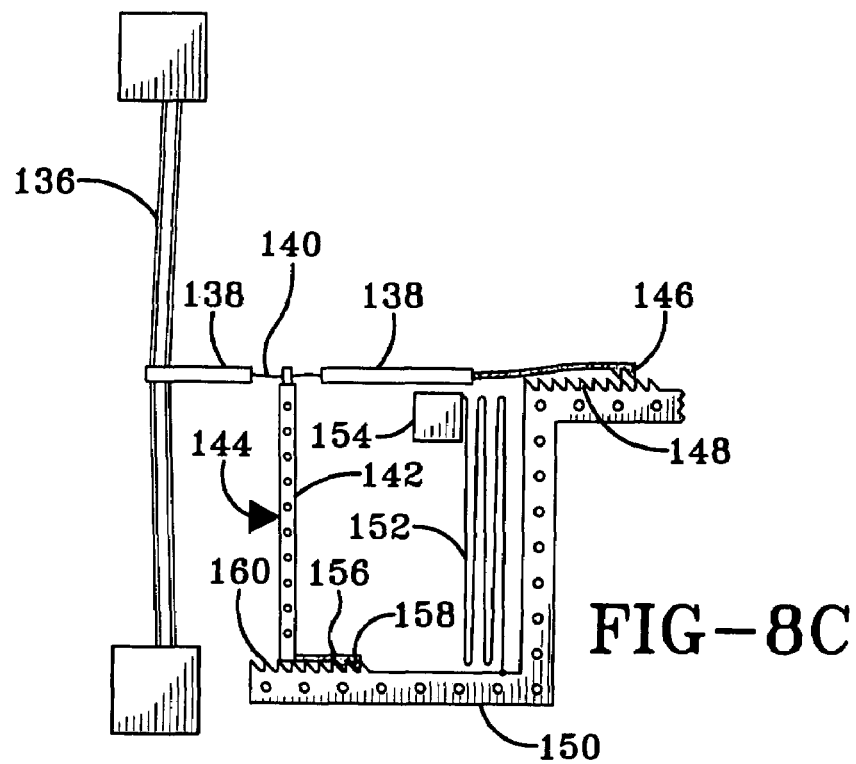

Extending from the bottom of lever 142 is arm 156 having a set of teeth 158 at its end. These teeth 158 engage with teeth 160 located on a lower portion of slider 150. In operation, and as indicated in FIG. 8B, when the V-beam actuator 136 is activated to move to the left, the bottom of lever 142 will move to the right. In so doing, engaged teeth 158 and 160 will cause slider 150 to move to the right, while teeth 146 slide over teeth 148. At the full extent of travel, as indicated in FIG. 8C, teeth 146 lock with teeth 148 to act as a keeper.

Figure 8D:
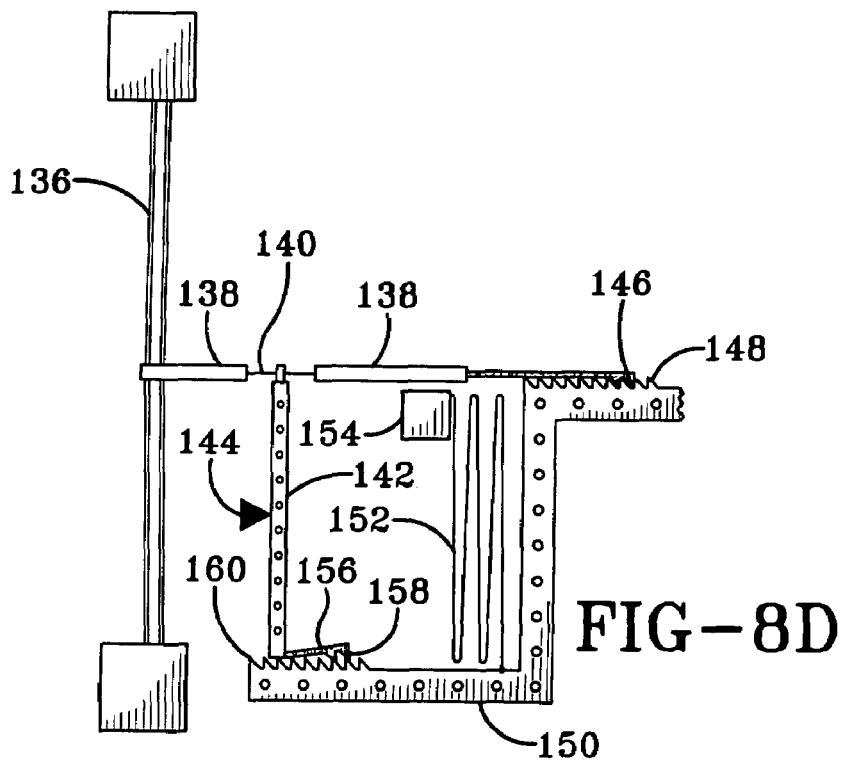

When the V-beam actuator 136 is deenergized, as in FIG. 8D, it moves to the right causing locked teeth 146 and 148 to also move the slider 150 to the right, with teeth 158 and 160 now acting as a keeper. The process is repeated such that with each energization and deenergization of V-beam actuator 136, slider 150 will continuously move to the right. Thus, teeth 158, at the bottom of lever 142 act as a keeper when teeth 146 are driving then slider 150, and vice versa.

It will be understood that many additional changes in the details, materials, steps and arrangement of parts, which have been herein described and illustrated in order to explain the nature of the invention, may be made by those skilled in the art within the principle and scope of the invention as expressed in the appended claims.

For example, although only one thermoelectric actuator has been illustrated, two such thermoelectric actuators can be employed to move two levers both connected to a single slider. These two thermoelectric actuators can operate alternatively or in tandem to provide double the driving force and decrease the number of cycles required for desired slider travel. Further, the direction of travel of the slider upon energization and deenergization of the thermoelectric actuators will depend upon the directional orientation of the complementary engaging teeth.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A MEMS linear thermoelectric motor apparatus, comprising:
    a thermoelectric actuator being operable to move in a first direction when energized by a current and operable to move in an opposite direction when deenergized by removal of said current;
    actuator device being connected to said thermoelectric actuator for movement by said thermoelectric actuator when it is energized and deenergized, and including at least one set of drive teeth;
    a slider member having at least a first set of teeth,
        wherein said at least one set of drive teeth are engaged with said at least a first set of teeth to move said slider when said thermoelectric actuator is one of energized and deenergized, depending upon the direction of said teeth engagement;
    a spring being connected to said slider to bias said slider to an initial position; and
    a keeper means comprising a keeper arrangement engageable with said slider to maintain said slider in position against the action of said spring, after said slider is advanced.

2. The apparatus according to claim 1, wherein said slider includes a second set of teeth; and said keeper arrangement includes a set of keeper teeth engageable with said second set of teeth on said slider.

3. The apparatus according to claim 1, wherein said thermoelectric actuator is a V-shaped beam actuator.

4. The apparatus according to claim 1, wherein said thermoelectric actuator is a U-shaped beam actuator.

5. The apparatus according to claim 1, wherein said actuator device comprises an actuator arm, with said at least one set of drive teeth situated at an end of said actuator arm.

6. The apparatus according to claim 5, wherein said keeper arrangement includes a keeper arm comprising one end secured to an anchor, with said keeper teeth located at an opposite end.

7. The apparatus according to claim 1, wherein said actuator device includes a lever pivotable about a fulcrum; said lever comprises said drive teeth at a lower portion thereof; said actuator device includes an actuator arm coupled to move said lever about said fulcrum.

8. The apparatus according to claim 7, wherein said actuator arm of said actuator device contacts said lever in a middle portion thereof.

9. The apparatus according to claim 7, wherein said actuator arm of said actuator device contacts said lever in a middle portion thereof, and
    wherein said keeper arrangement includes a keeper arm comprising one end secured to an anchor, with said keeper teeth located at an opposite end.

10. A MEMS linear thermoelectric motor apparatus, comprising:
    a thermoelectric actuator being operable to move in a first direction when energized by a current and operable to move in an opposite direction when deenergized by removal of said current;
    actuator device being connected to said thermoelectric actuator for movement by said thermoelectric actuator when it is energized and deenergized, and including at least one set of drive teeth;
    a slider member having at least a first set of teeth; and
    a spring being connected to said slider to bias said slider to an initial position,
        wherein said actuator device includes a lever pivotable about a fulcrum; said lever comprises said at least one set of drive teeth at an end portion thereof,
        wherein said actuator device comprises an actuator arm, said actuator arm comprises a flexural member portion,
        wherein a top of said lever is connected to said flexural member, and
        wherein said fulcrum is positioned at a middle portion of said lever.

11. The apparatus according to claim 10, wherein said actuator arm includes a second set of drive teeth at an end thereof, and
    wherein a bottom of said lever includes said at least one set of drive teeth, said at least one set of drive teeth at the bottom of said lever drives said slider, and vice versa.

12. The apparatus according to claim 11, wherein said at least one set of drive teeth are engaged with said at least a first set of teeth to move said slider when said thermoelectric actuator is one of energized and deenergized, depending upon the direction of said teeth engagement.

13. The apparatus according to claim 10, wherein said slider includes a microdetonator at the end thereof.

* * * * *